UNITED STATES PATENT OFFICE.

DUNCAN R. FRANKLIN, OF NEW YORK, N. Y., ASSIGNOR TO S. M. BIXBY & COMPANY, OF NEW YORK, N. Y., A CORPORATION OF NEW YORK.

BLACKING OR DRESSING FOR METAL SURFACES.

1,001,381.

Specification of Letters Patent.   Patented Aug. 22, 1911.

No Drawing.   Application filed September 10, 1909.   Serial No. 517,050.

*To all whom it may concern:*

Be it known that I, DUNCAN R. FRANKLIN, a citizen of the United States, and a resident of New York, county of New York, and State of New York, have invented certain new and useful Improvements in Blackings or Dressings for Metal Surfaces, of which the following is a specification.

My invention relates to blackings or dressings for metal surfaces and more especially to that class which are used for polishing stoves and other articles which are intended to be heated.

In certain prior compositions for stove blackings or polishes it has been customary to use graphite or other carbonaceous material and in some instances to combine with this a filler. In such compositions, however, the filler has been of a character, which when subjected to heat decomposes, such that it is not united in any way to the iron or metallic surface and readily becomes loosened so that the whole coating or polish soon wears away after a short usage.

It is one object of my invention to provide a composition in which at least one of the ingredients shall be of a nature to firmly adhere to the surface of the metallic iron or other metallic surface, and, especially when heat is applied thereto, which will more intimately unite with the metallic surface in such a way that a coating is secured which will be very permanently fixed by the heating and wears almost indefinitely as compared with prior polishes. In order to bring about this result I provide a dressing containing a metal in a form which under the action of heat turns into a black compound which readily and firmly unites with the iron.

Preferably the metal is applied in the form of an emulsion of a compound of the metal so that when heat is applied the compound breaks up, forming a black oxid of the metal which is very stable and strongly adheres to the metallic surface. In many instances I also find it advantageous to use a black filler of carbonaceous material.

The preferred form of composition which I use consists of a water emulsion or solution of cobalt hydrate and a filler of graphite or carbon black. The use of the hydrate or hydroxid of cobalt is preferable and advantageous since it decomposes at comparatively low temperatures, *i. e.* about 325° F., that is, temperatures found in the ordinary stove while baking pastry, etc.

When this composition is applied to a stove or other iron surface which is afterward heated, the heat causes a decomposition of the hydrate and the formation of a black oxid of cobalt. This black oxid may be a composition of several of the cobalto-cobaltic oxids. The oxid thus formed while in contact with the iron which is in a heated condition is firmly united with the iron and can only be removed by slow degrees in the ordinary use of the stove. Any further heating of the surface has no effect on the composition, except to more firmly fix it in position. Furthermore, when applied to stoves or other iron surfaces the metallic oxid permits the surface turning red which is a common occurrence due to the formation of red oxid of iron.

Although I prefer to use cobalt hydrate, nevertheless other cobalt compounds may be used, such as the salts thereof and even the oxids themselves although it is important that they decompose or finally result in a black compound or compounds with the ordinary heat of stoves or below 100° F. Compounds which do not result in the black compound or compounds at the ordinary heat of stoves are obviously commercially unfit for a stove blacking. Furthermore, although I consider the cobalt compounds to have many advantages over any others, nevertheless for some purposes certain compounds of other metals and even the metals themselves may be used with advantageous results. In order to get good results, however, I prefer the use of some metal or metallic compound which under the action of heat decomposes at a sufficiently low temperature into a black oxid or oxids which firmly adhere to the iron, possibly forming a chemical combination therewith. For this purpose I would select metals of the iron group other than iron as being best suited, since under some conditions nickel compounds form a very efficient blacking.

I am aware that certain copper compounds and especially copper salts have been suggested under certain conditions. In this case the compound breaks up and the black oxid of copper is formed. I find, however, that copper compounds do not give as good results as the cobalt compounds since the copper compounds are very liable to decompose into oxids other than the black oxids, and the cobalt dressing has many advantages over the copper dressing.

For the filler I prefer to use graphite, or lamp or gas black, although other carbonaceous materials may be used to advantage. Certain fillers may also be used which are not carbonaceous.

When the composition is in the form of an emulsion the metallic compounds may be held therein in suspension, or in solution, or both. In any of these forms, however, the dressing is easily applied to the metallic surface in such a manner that it is evenly distributed thereover and brought into intimate contact with the surface.

Although I have described my improvements in great detail, nevertheless I do not desire to be limited to the specific compounds mentioned, except as specified hereafter in the claims, since many modifications within the spirit and scope of my invention will occur to the skilled chemist. But Having fully and clearly described my invention, what I desire to secure by Letters Patent is:—

1. A blacking or dressing for iron surfaces including an emulsion of cobalt hydrate capable of being decomposed under the action of heat to produce black oxid of cobalt.

2. A blacking or dressing for iron surfaces including a black filler of graphite and a water emulsion of cobalt hydrate capable of being decomposed under the action of heat to produce black oxid of cobalt.

3. A blacking or dressing for iron surfaces including an emulsion of a cobalt compound capable of being decomposed by heat at about 325° F. to produce a black oxid of cobalt.

4. A blacking or dressing for metal surfaces including cobalt in a form capable of being changed by heat to produce an oxid of cobalt at a temperature below 400° F.

5. A blacking or dressing for metal surfaces including cobalt in a form capable of being changed by heat at a temperature below 400° F. to produce an oxid of cobalt and a black filler.

6. A blacking or dressing for metal surfaces including a compound of a metal of the iron group capable of and in a form designed to be changed into an oxid under the action of heat at a temperature below 400° F.

7. A blacking or dressing for metal surfaces including a metal of the iron group capable of and in a form designed to be changed into a black compound under the action of heat at a temperature below 400° F.

8. A blacking or dressing for metal surfaces including a metal of the iron group capable of and in a form designed to be changed into a black compound under the action of heat at about 325° F. and a black filler.

9. A blacking or dressing for metal surfaces including a liquid containing a cobalt compound designed to be decomposed by heat below 400° F. to produce a black oxid of cobalt, and a carbonaceous filler.

In testimony whereof, I have signed my name to this specification, in the presence of two subscribing witnesses.

DUNCAN R. FRANKLIN.

Witnesses:
GORHAM CROSBY,
EDWIN SEGER.